United States Patent [19]

Suzuki

[11] Patent Number: 5,218,588
[45] Date of Patent: Jun. 8, 1993

[54] FOCUS OFFSET CORRECTION METHOD

[75] Inventor: Haruyuki Suzuki, Kawasaki, Japan

[73] Assignee: Ricoh Company, Ltd., Tokyo, Japan

[21] Appl. No.: 713,722

[22] Filed: Jun. 11, 1991

[30] Foreign Application Priority Data

Jun. 18, 1990 [JP] Japan ............... 2-160950

[51] Int. Cl.⁵ .............................. G11B 7/09
[52] U.S. Cl. ........................ 369/44.270; 369/44.29;
369/44.32; 250/201.5
[58] Field of Search ............ 369/44.27, 44.25, 44.28,
369/44.29, 44.32, 44.41, 44.42, 44.26, 44.11,
44.12; 250/201.5

[56] References Cited

U.S. PATENT DOCUMENTS

| | | | |
|---|---|---|---|
| 4,607,913 | 8/1986 | Jansen | 350/247 |
| 4,707,648 | 11/1987 | Minami | 369/44.41 |
| 4,779,251 | 10/1988 | Burroughs | 369/32 |
| 4,779,253 | 10/1988 | Getreuer et al. | 369/44 |
| 4,819,220 | 4/1989 | Miyazaki et al. | 369/44.29 |
| 4,951,275 | 8/1990 | Saitoh et al. | 369/44.41 |
| 4,967,403 | 10/1990 | Ogawa et al. | 369/44.26 |
| 5,023,861 | 6/1991 | Champagne et al. | 369/215 |
| 5,077,719 | 12/1991 | Yanagi et al. | 369/44.29 |
| 5,079,756 | 1/1992 | Kuwabara | 369/44.28 |
| 5,144,609 | 9/1992 | Takeda et al. | 369/44.41 |

FOREIGN PATENT DOCUMENTS 182638  8/1986  Japan .

OTHER PUBLICATIONS

U.S. Serial No. 07/624,885, filed on Dec. 3, 1990.
U.S. Ser. No. 07/644,948, filed on Jan. 23, 1991.

Primary Examiner—Aristotelis Psitos
Assistant Examiner—Muhammad N. Edun
Attorney, Agent, or Firm—Cooper & Dunham

[57] ABSTRACT

A focus offset correction method for optical information read/write device, the device comprising: a first amplitude detection circuit for detecting amplitude of a tracking error signal obtained from a record medium; a second amplitude detection circuit for detecting amplitude of an information reading signal; a tracking servo circuit for moving a laser beam to follow fluctuation of a track on the record medium; a focus servo circuit for controlling the laser beam so that a beam waist thereof is positioned on the record medium; and an offset adder for applying an offset to the focus servo circuit. The focus offset correction method comprises a first process for determining a range of the offset in which range an output from the first amplitude detection circuit always exceeds a predetermined value; and a second process for determining the offset which makes an output from the second amplitude detection circuit almost maximum.

4 Claims, 3 Drawing Sheets

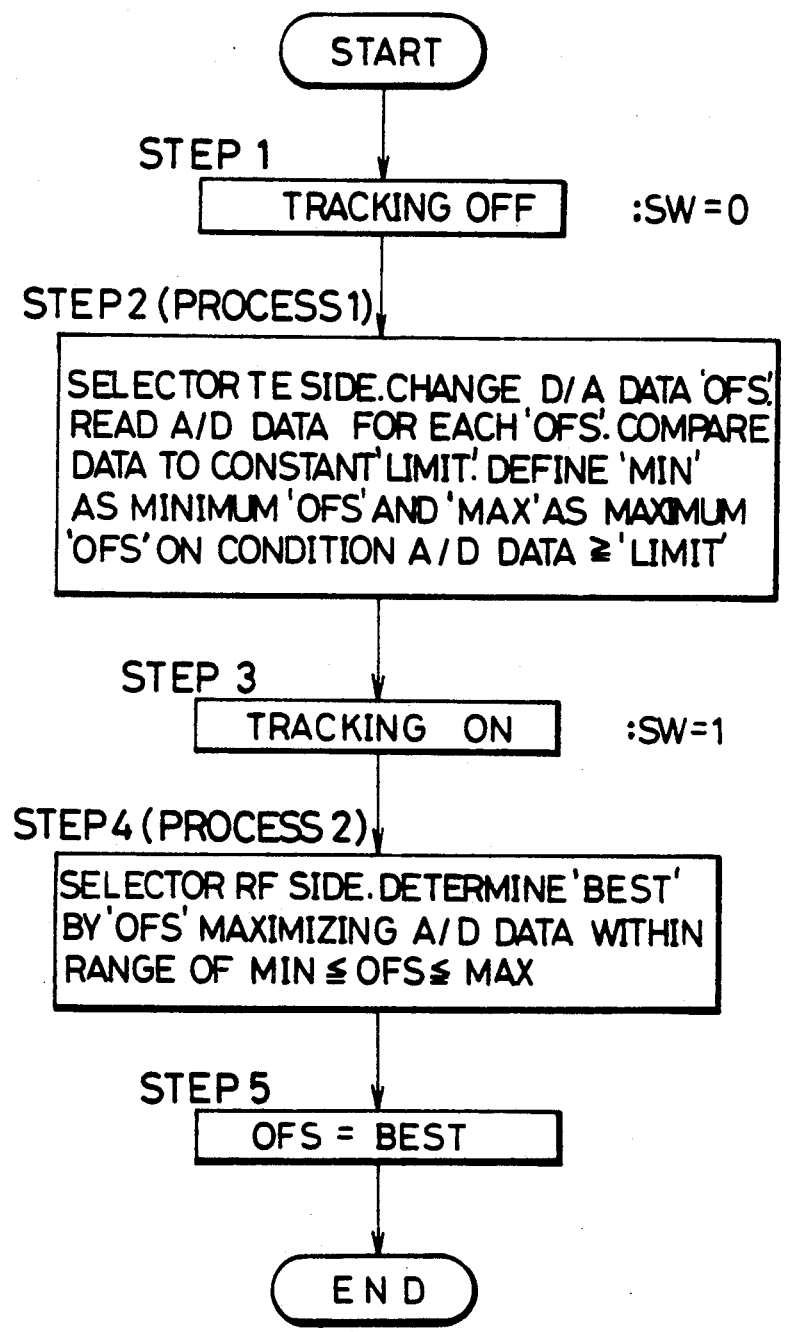

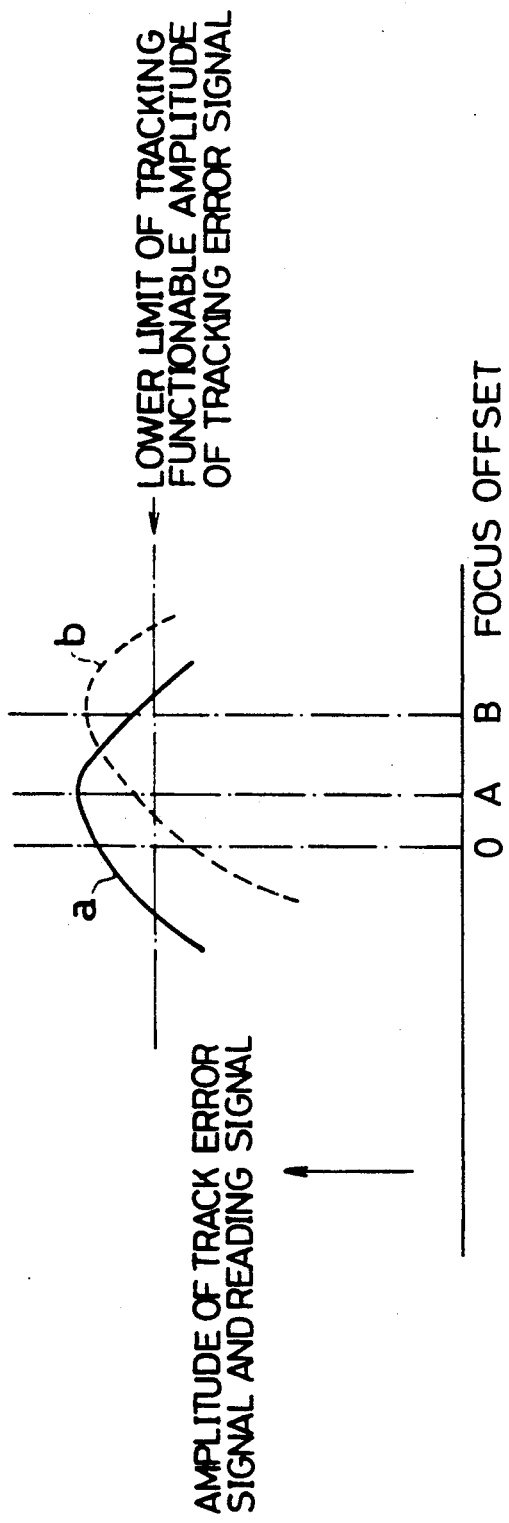

FOCUS OFFSET CORRECTION METHOD

BACKGROUND OF THE INVENTION

1. Field of the Invention

The present invention relates to a focus offset correction method, more particularly, it relates to a method for determining a focus offset of an optical disk device.

2. Description of the Related Art

An optical information read/write device comprises a focus servo circuit system which irradiates an optical spot on a disk surface to write information data in a high density and read data from the disk. The focus servo circuit comprises a focus error detection circuit which detects the dislocation of the spot from the focal point of the objective lens. The lens is attached to an actuator which drives the lens in a direction perpendicular to the disk surface in response to the output signal from the focus error detection circuit so that the spot on the disk surface is always kept at the focal point of the objective lens.

However, if the lens is inaccurately assembled at a dislocated position, the focal point of the lens is dislocated from the disk surface even when the focus servo control is conducted. Besides, the disk surface is fluctuated during the operation, which increases the dislocation of the focal point. As a result, the information data is not correctly written in the disk and the level of signal for reading the data is lowered, which decreases the reliability of the read/write function of the device.

In order to cope with such problems, for example, Japanese Patent Application Laying Open (KOKAI) No. 61-182638 discloses a focus servo circuit for optical read/write device. According to the proposed circuit of the patent document, an offset is arranged in the focus servo circuit so that the amplitude of the reading signal from the optical disk is maximized.

To detect the amplitude of the reading signal stably and reliably, it is necessary to position the optical spot on the adjusting track and follow the track by a tracking servo control means. In this case, when the focus offset value for maximizing each of the tracking error signal amplitude and the reading signal is far away from zero point, it becomes difficult to accurately carry out the tracking operation or even the servo system becomes out of control since the tracking error signal amplitude in the initial state where the focus offset is zero is far smaller than the optimal value.

In such a case, the tracking has to be rearranged by repeating trial and error by changing the focus offset value, which takes much time.

Also, it is undesirable that the tracking servo system becomes out of control since the actuator of the servo system or optical elements may be damaged by reckless motion of the system.

On the other hand, the above-mentioned patent publication discloses the focus serve circuit wherein the optimal value of the focus offset is determined so as to maximize the tracking error signal amplitude at the time when the tracking serve is off. However, if the optical spot on the disk surface has astigmatism generated therein, the reading signal amplitude does not become maximum when the tracking signal amplitude is being maximum, which makes it difficult to determine the optimal focus offset value.

SUMMARY OF THE INVENTION

The present invention was made considering the above-mentioned points. It is therefore an object of the present invention to provide a focus offset correction method which makes it possible to determine the optimal focus offset value accurately and reliably without malfunctioning the tracking servo system.

The above-mentioned object of the present invention can be achieved by a focus offset correction method for optical information read/write device comprising:

a first amplitude detection means for detecting amplitude of a tracking error signal obtained from a record medium;

a second amplitude detection means for detecting amplitude of an information reading signal;

a tracking servo means for moving a laser beam to follow fluctuation of a track on the record medium;

a focus servo means for controlling the laser beam so that a beam waist thereof is positioned on the record medium; and an offset adder means for applying an offset to the focus servo means, the focus offset correction method comprising:

a first process for determining a range of the offset in which range an output from the first amplitude detection means always exceeds a predetermined value; and a second process for determining the offset which makes an output from the second amplitude detection means almost maximum.

In accordance with the present invention, the focus offset correction method comprises the first process for determining an offset range wherein the output from the detection means for detecting the tracking error signal amplitude exceeds a predetermined value and the second process for determining an offset value which makes the output from the detection means for detecting the reading information signal amplitude become almost maximum in the above-mentioned range. Therefore, it is an advantage of the present invention, due to the arrangement mentioned above, that it becomes possible to reliably determine an optimal focus offset value for obtaining an accurate reading signal without malfunctioning the tracking servo system.

Further objects and advantages of the present invention will be apparent from the following description of the preferred embodiments of the invention as illustrated in the accompanying drawings.

BRIEF DESCRIPTION OF THE DRAWINGS

FIG. 2 is a flow chart of the function of a microcomputer in accordance with the present invention; and FIG. 3 is a graphical view for representing the relation between the offset applied to the focus servo circuit and the amplitude of the tracking error signal.

DESCRIPTION OF THE PREFERRED EMBODIMENTS

Figure 1:
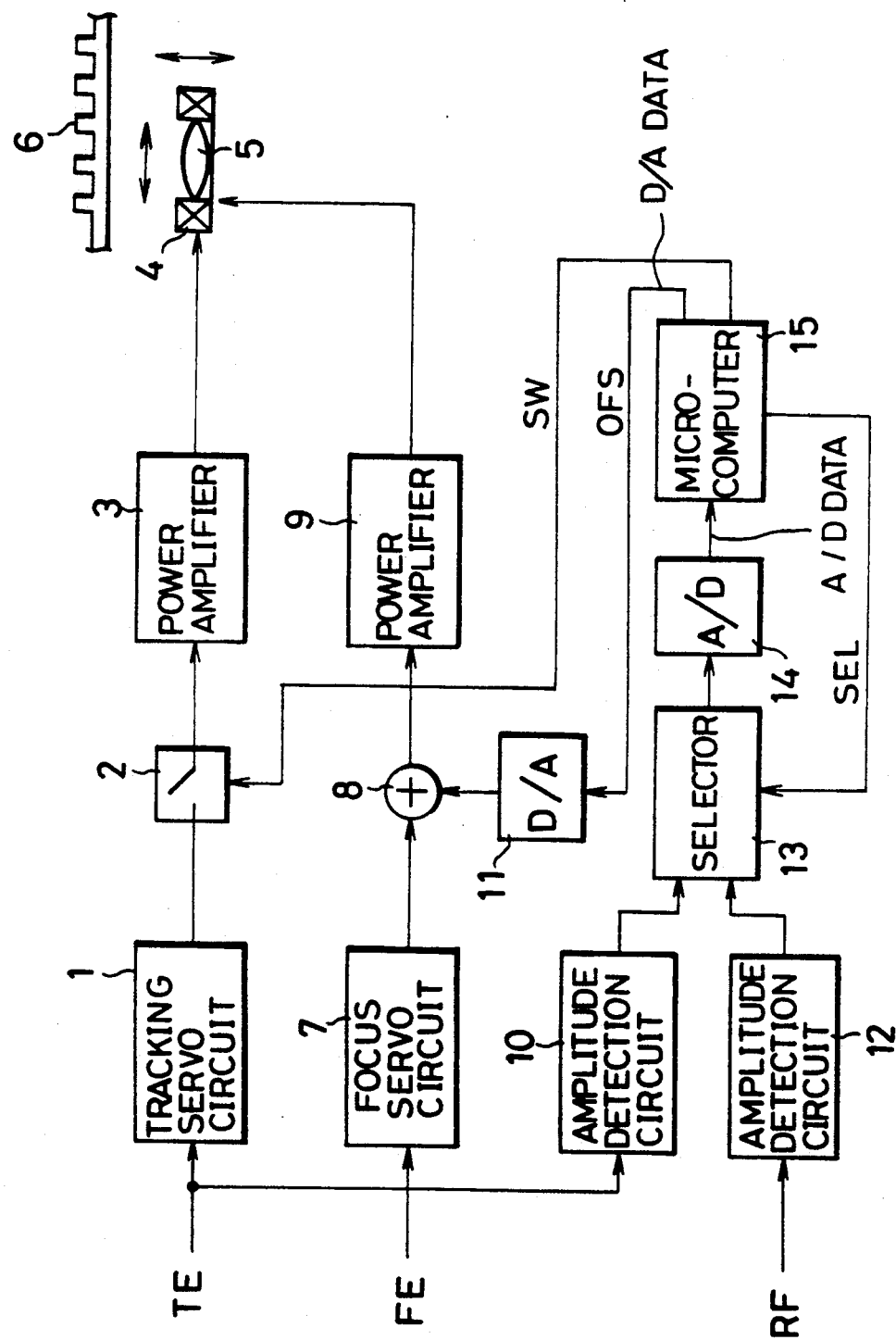
FIG. 1 is a constructional block diagram of an arrangement for carrying out an embodiment of the focus offset correction method in accordance with the present invention.

As mentioned before, to reliably detect the reading signal amplitude, it is necessary to arrange the optical spot to follow the adjusting track by a tracking servo means. If the relation between the offset applied to the focus servo circuit and the amplitude of the tracking error signal is as represented by the solid line a in the graph of FIG. 3, it becomes possible to determine the optimal value A of the focus offset continuing the normal tracking function. In this case, the reading signal amplitude and the tracking error signal amplitude often change similarly with respect to the focus offset.

On the other hand, if the relation is represented as the dash line b in the graph of FIG. 3 wherein the focus offset value for maximizing each of the tracking error signal amplitude and the reading signal is far away from zero point, it becomes difficult to accurately carry out the tracking operation or even the servo system becomes out of control since the tracking error signal amplitude in the initial state where the focus offset is zero is far smaller than the optimal value.

In such a case, the tracking has to be rearranged by repeating trial and error by changing the focus offset value, which takes much time.

Also, it is undesirable that the tracking servo system becomes out of control since the actuator of the servo system or optical elements may be damaged by reckless motion of the system.

The above-mentioned problems can be attenuated or obviated by the embodiment of the present invention described below.

FIG. 1 illustrates a block diagram of the focus offset correction arrangement in accordance with an embodiment of the present invention.

The structure of FIG. 1 comprises a tracking servo circuit 1, a switch 2, a first power amplifier 3, an actuator 4, an objective lens 5, an optical disk 6, a focus servo circuit 7, an adder 8, a second power amplifier 9, a first amplitude detection circuit 10, a D/A converter 11, a second amplitude detection circuit 12, a selector 13, an A/D converter 14, and a microcomputer 15.

In FIG. 1, reference TE represents a tracking error signal obtained from a not shown optical system. In the state where the switch 2 is being off, the signal is represented by a sine curve waveform with a cycle of period corresponding to one track. The signal TE drives the actuator 4 through the servo circuit 1 and the amplifier 3 so as to carry out the tracking function wherein the objective lens 5 is moved in the direction perpendicular to the track.

Reference FE represents a focus error signal which drives the actuator 4 through the servo circuit 7, the adder 8 and the amplifier 9 so as to carrying out the focusing function wherein the objective lens 5 is moved in the direction perpendicular to the recording surface of the disk 6.

Reference RF represents a reading signal which is obtained from the disk and used for reading the data recorded in the disk by a not shown signal processing circuit.

The circuits 10 and 12 detect the amplitudes of the signals TE and RF, respectively, The outputs from the circuits 10 and 12 are input to the selector 13 which selects and changes the signals to be transmitted to the A/D converter 14 where each signal is converted to an digital signal which is then read by the computer 15. The computer 15 drives the switch 2, changes the selector 13 and transmits the data to the D/A converter 11. The output from the converter 11 is added to the focus servo system by the adder 8 so as to determine the focus offset value.

FIG. 2 illustrates a flow chart for explaining the function of the microcomputer in accordance with the present invention.

Step 1; First, the switch 2 is turned off (sw=0) so that the tracking operation is turned off.

Step 2 (Process 1); The selector 13 is set to the signal TE side. The offset (OFS) of the D/A data is changed one after another so that the offset applied to the focus servo system is changed one after another. The amplitudes of the signal TE for respective offset (OFS) of the D/A data are read by the A/D converter 14 and compared with a predetermined constant LIMIT. The minimum OFS which satisfies the formula A/D data$\geq$LIMIT is defined as MIN while the maximum OFS which also satisfies the same formula is defined as MAX. The constant LIMIT corresponds to the lower limit of the amplitude of signal TE which enables to conduct the tracking operation.

In accordance with the above-mentioned process 1, the focus offset range in which the tracking operation can be conducted is determined as MIN$\leq$OFS$\leq$MAX.

Step 3; After that, the tracking operation is turned on (sw=1).

Step 4 (Process 2); The selector 13 is changed to the signal RF side. The focus offset value which maximizes the A/D data corresponding to the RF amplitude in the above-mentioned range MIN$\leq$OFS$\leq$MAX is defined as BEST. The offset value is fixed as OFS=BEST.

In accordance with the above mentioned process 2, the focus offset which maximizes the amplitude of the reading signal RF is applied to the focus servo system.

Step 5; The offset is set as OFS=BEST.

In accordance with the steps mentioned above, it becomes possible to determine the optimal focus offset value accurately and reliably.

Many widely different embodiments of the present invention may be constructed without departing from the spirit and scope of the present invention. It should be understood that the present invention is not limited to the specific embodiments described in the specification, except as defined in the appended claims.

What is claimed is:

1. A focus offset correction method for optical information read/write device, said device comprising:
    a first amplitude detection means for detecting amplitude of a tracking error signal obtained from a record medium;
    a second amplitude detection means for detecting amplitude of an information reading signal;
    a tracking servo means for moving a laser beam to follow fluctuation of a track on said record medium;
    a focus servo means for controlling said laser beam so that the focus point thereof is positioned on said record medium; and
    a focus offset adder means for applying a focus offset to said focus servo means,
    said focus offset correction method comprising:
    a first process for determining a plurality of focus offsets, for each of which a corresponding output from said first amplitude detection means is greater than a predetermined value when that focus offset is applied to said focus servo means; and
    a second process for determining the focus offset of said plurality of focus offsets for which a corresponding output from said second amplitude detection means is greatest.

2. A focus offset correction method according to claim 1, wherein said first detection means and said second detection means are connected to a selector which is connected to a microcomputer through an A/D converter, said microcomputer being programmed to execute said first and second processes.

3. A focus offset correction method according to claim 1, wherein tracking is not carried out during said first process and is carried out during said second process.

4. A focus offset correction method for an optical information read/write device comprising:
- a first amplitude detection means for detecting a tracking error signal obtained from a record medium;
- a second amplitude detection means for detecting an information reading signal;
- a tracking servo means for moving a laser beam to follow a track on said record medium;
- a focus servo means for controlling said laser beam so that a beam waist thereof is positioned on said record medium; and
- a focus offset adder means for applying a focus offset to said focus servo means, said focus offset correction method comprising the steps of:
- determining a plurality of focus offset, for each of which a corresponding tracking error signal detected by said first amplitude detection means exceeds a lower limit, and
- selecting the focus offset of said plurality of focus offsets for which the corresponding output from said second amplitude detection means is greatest, wherein a tracking operation is carried out during the step of selecting but not during said step of determining.

* * * * *